(12) United States Patent
Racicot

(10) Patent No.: US 8,446,944 B1
(45) Date of Patent: May 21, 2013

(54) DATA PROCESSING SYSTEM AND METHOD

(75) Inventor: Marc Racicot, Laval (CA)

(73) Assignee: Verint Video Solutions Inc., Melville, NY (US)

( * ) Notice: Subject to any disclaimer, the term of this patent is extended or adjusted under 35 U.S.C. 154(b) by 433 days.

(21) Appl. No.: 12/771,271

(22) Filed: Apr. 30, 2010

Related U.S. Application Data

(60) Provisional application No. 61/174,091, filed on Apr. 30, 2009.

(51) Int. Cl.
*H04B 1/66* (2006.01)
*G06F 13/28* (2006.01)

(52) U.S. Cl.
USPC ........................................ 375/240.01; 710/22

(58) Field of Classification Search
USPC 348/441, 554, 598, 715; 375/240.01–240.26; 382/199; 710/22, 23, 24; 712/35, 36, 33
See application file for complete search history.

(56) References Cited

U.S. PATENT DOCUMENTS

| | | | |
|---|---|---|---|
| 6,330,623 B1* | 12/2001 | Wu et al. | 710/23 |
| 6,401,143 B1* | 6/2002 | Lupien et al. | 710/22 |
| 2001/0038704 A1* | 11/2001 | Ito et al. | 382/100 |
| 2008/0126602 A1* | 5/2008 | Biran et al. | 710/22 |
| 2008/0168259 A1* | 7/2008 | Biran et al. | 712/207 |
| 2009/0055157 A1* | 2/2009 | Soffer | 703/27 |
| 2009/0072038 A1* | 3/2009 | Li et al. | 235/462.41 |
| 2009/0216964 A1* | 8/2009 | Palladino et al. | 711/154 |
| 2009/0316798 A1* | 12/2009 | Mimar | 375/240.26 |
| 2011/0188580 A1* | 8/2011 | Valmiki et al. | 375/240.24 |

* cited by examiner

*Primary Examiner* — Behrooz Senfi
(74) *Attorney, Agent, or Firm* — Andrus, Sceales, Starke & Sawall, LLP

(57) ABSTRACT

A data processing device is provided. The data processing device includes a first port configured to receive data from a first bus, and a direct memory access (DMA) engine coupled to the first port. The DMA engine is configured to receive the data from the first bus, receive a contiguous scatter-gather list from a processing device via a second port, configure the data according to the contiguous scatter-gather list, and provide the configured data to the processing device through the second port. The second port is configured to write the configured data to the processing device over a second bus.

18 Claims, 7 Drawing Sheets

| OFFSET | NAME | ACCESS | DESCRIPTION |
|---|---|---|---|
| 0x0000 | DMA_SG_PCI_ADDRESS_255 | RW | PCI ADDRESS 255 |
| 0x0004 | DMA_SG_PCI_SIZE_255 | RW | PCI SIZE 255 |
| ... | ... | ... | ... |
| 0x07F0 | DMA_SG_PCI_ADDRESS_1 | RW | PCI ADDRESS 1 |
| 0x07F4 | DMA_SG_PCI_SIZE_1 | RW | PCI SIZE 1 |
| 0x07F8 | DMA_SG_PCI_ADDRESS_0 | RW | PCI ADDRESS 0 |
| 0x07FC | DMA_SG_PCI_SIZE_0 | RW | PCI SIZE 0 |
| 0x0800 | DMA_SIZE | RW | Total transfer size, in bytes |
| 0x0804 | DMA_CONTROL | W | Kick starts the DMA engine on a write |

Figure 5

DATA PROCESSING SYSTEM AND METHOD

RELATED APPLICATIONS

This application hereby claims the benefit of and priority to U.S. Provisional Patent Application 61/174,091, titled "DIRECT MEMORY ACCESS SYSTEM", filed on Apr. 30, 2009, which is hereby incorporated by reference in its entirety.

TECHNICAL BACKGROUND

Many processing systems, whether simple or complex, use data buses to transfer data between components. One common data bus configuration is a peripheral component interconnect (PCI) data bus. These inexpensive buses are often used to transfer data, for example, between a processor and an external memory, or between a data capture device and a processor. Depending on the desired configuration, different devices may act as a PCI master and write the data on the PCI bus for reception at a device operating as a PCI slave device.

In some common configurations, the processor is configured as a PCI master and reads data from a data capture device, and writes data to a memory device, such as a hard disc. However, due to the operation of the PCI buses, when data is read from a device by a PCI master, the data may be delayed due to the target device when it is not ready to transfer data. This results in delays in the data transfer and may affect system performance.

OVERVIEW

In an embodiment, a data processing device is provided. The data processing device includes a first port configured to receive data from a first bus, and a direct memory access (DMA) engine coupled to the first port. The DMA engine is configured to receive the data from the first bus, receive a contiguous scatter-gather list from a processing device via a second port, configure the data according to the scatter-gather list, and provide the configured data to the processing device through the second port. The second port is configured to write the configured data to the processing device over a second bus.

In a further embodiment, a method for the operation of a data processing device is provided. The method includes receiving data through a first port from a first bus, receiving a contiguous scatter-gather list through a second port from a second bus, configuring the data according to the contiguous scatter-gather list, resulting in configured data, and writing the configured data to a processing device through the second port and the second bus.

In another embodiment, a video system is provided. The video system includes a video capture device configured to capture video data of a scene, a video decoder coupled to the video capture device, configured to translate captured video data to digital video data, and a video compressor coupled to the video decoder, configured to compress the digital video data resulting in compressed digital video data. The video system also includes a data processor coupled to the video compressor. The data processor includes a first port configured to receive compressed digital video data from the video compressor, a direct memory access (DMA) engine coupled to the first port, configured to receive compressed digital video data from the first port, and a second port configured to write configured video data to a bus.

The video system further includes a video processor coupled to the data processor, configured to receive configured video data from the data processor through the bus, and a memory device coupled to the video processor, configured to store configured video data. The DMA engine is configured to receive a contiguous scatter-gather list at the second port from the video processor through the bus, configure the compressed video data according to the contiguous scatter-gather list resulting in configured video data, and write the configured video data to the video processor through the second port and the bus. The video processor is configured to store the configured video data in the memory device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 5 illustrates register map of a contiguous scatter-gather list.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
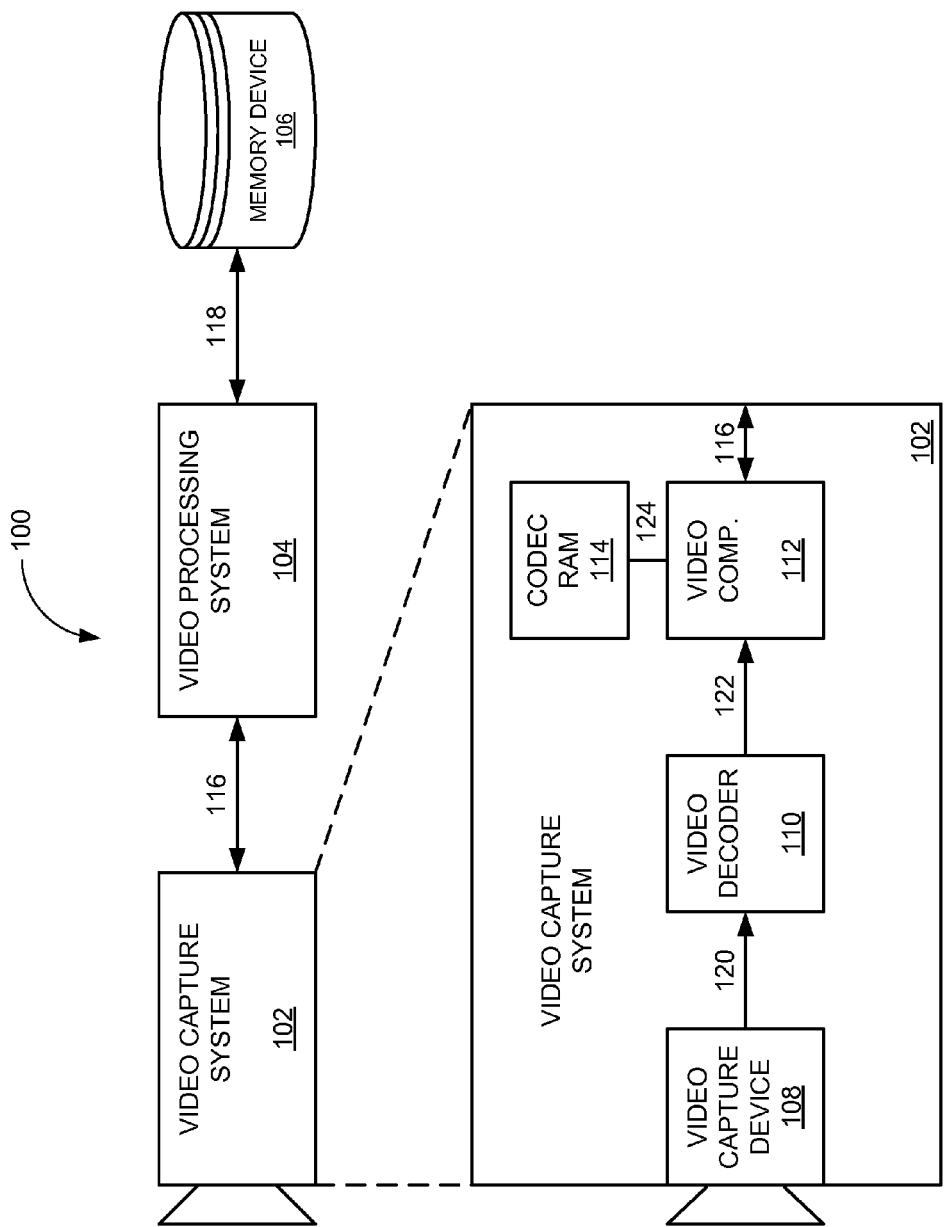
FIG. 1 illustrates a prior art video system.

FIG. 1 illustrates prior art video system 100. Video system 100 includes video capture system 102, video processing system 104, and memory device 106. Video capture system 102 is coupled with video processing system 104 through link 116, while video processing system 104 is coupled with memory device 106 though link 118. Links 116 and 118 may be any link capable of communicating data between devices. For example links 116 and 118 may be wireless or wired links. They may include other network devices such as gateways, routers, networks, and the like. They also may use any of a wide variety of communication protocols.

Video capture system 102 may be any system or device capable of capturing video data. In some examples, it may include on-board data conversion and data compression. Video processing system 104 may be any system or combination of hardware, firmware, and software capable of processing video data. Video processing system 104 may include a central processing unit (CPU), a microprocessor, or the like.

Memory device 106 may be any device capable of storing digital data. Memory device 106 may be a hard drive, RAM, floppy disk, CD-ROM, DVD-ROM, or the like.

Video capture system 102 includes video capture device 108, video decoder 110, video compressor 112, and codec RAM 114. Video capture device 108 is coupled with video decoder 110 through link 120, video decoder 110 is coupled with video compressor 112 through link 122, and video compressor 112 is coupled with codec RAM 114 through link 124. These links may be wireless or wired links. They may include other network devices such as gateways, routers, networks, and the like. They also may use any of a wide variety of communication protocols. In an example, links 120, 122, and 124 are high speed local buses all contained within video capture system 102 to allow for high speed data transfers between the individual devices making up video capture system 102.

In an example, video capture device 108 captures video data of a scene and transfers the analog video data to video decoder 110 through link 120. Video decoder 110 decodes the analog video data into digital video data, and transfers the digital video data to video compressor 112 over link 122. Video compressor 112 along with codec RAM 114 compresses the digital video data into any of a wide variety of formats such as AVI, MPEG, or the like.

Video processing system 104 reads the compressed digital video data from video compressor over link 116. In an example, link 116 may be a PCI data bus, in which case video processing system 104 acts as a PCI master to read the compressed digital video data from video compressor 112 through the PCI data bus. Video processing system 104 then writes the compressed digital video data onto memory device 106 through link 118. In an example, link 118 may also be a PCI data bus, and video processing system 104 acts as a PCI master in writing the video data to memory device 106.

Figure 2:
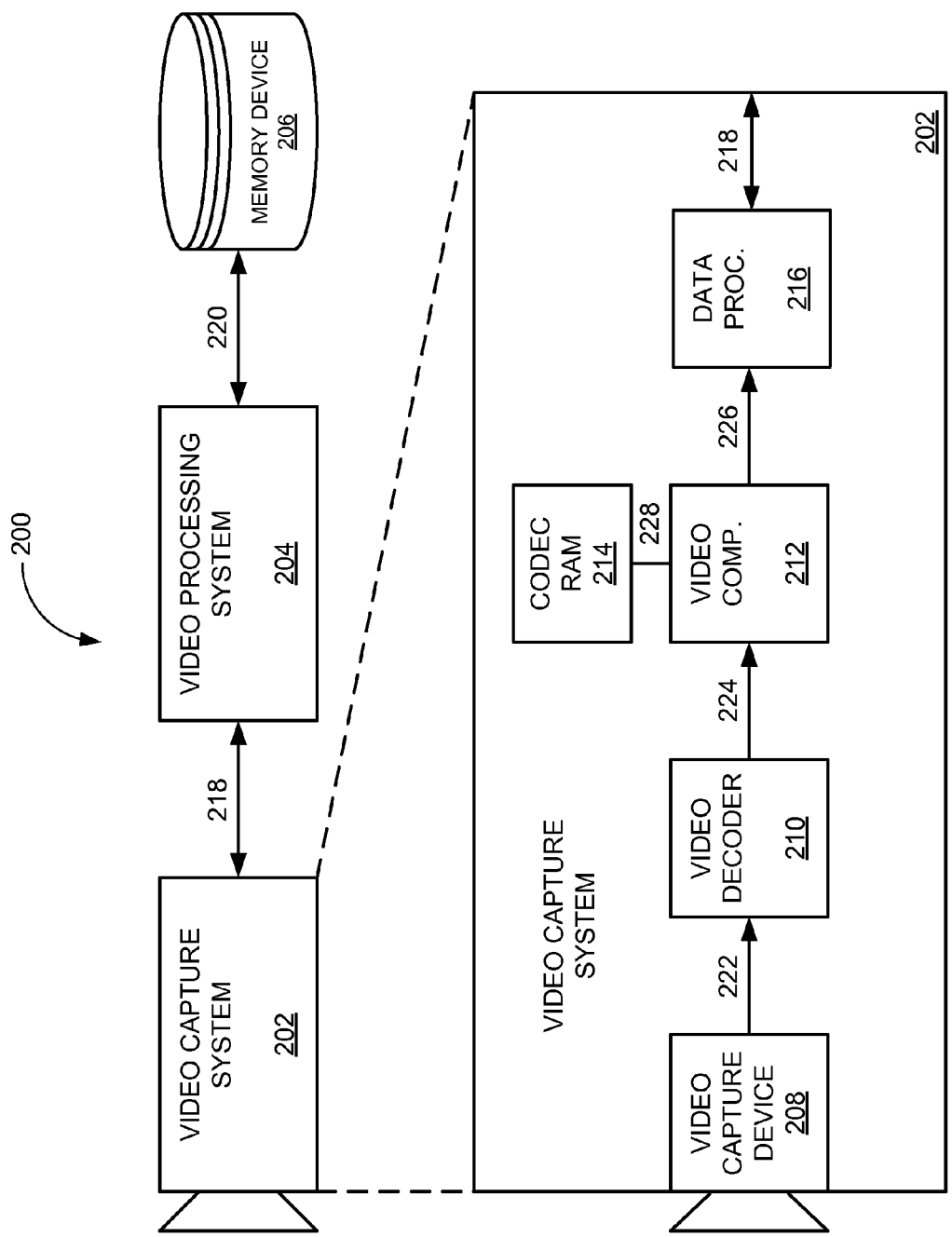
FIG. 2 illustrates a video system.

FIG. 2 illustrates video system 200. Video system 200 includes video capture system 202, video processing system 204, and memory device 206. Video capture system 202 is coupled with video processing system 204 through link 218, while video processing system 204 is coupled with memory device 206 though link 220. Links 218 and 220 may be any link capable of communicating data between devices. For example links 218 and 220 may be wireless or wired links. They may include other network devices such as gateways, routers, networks, and the like. They also may use any of a wide variety of communication protocols.

Video capture system 202 may be any system or device capable of capturing video data. In some examples, it may include on-board data conversion and data compression. Video processing system 204 may be any system or combination of hardware, firmware, and software capable of processing video data. Video processing system 204 may include a central processing unit (CPU), a microprocessor, or the like. Memory device 206 may be any device capable of storing digital data. Memory device 206 may include a hard drive, RAM, floppy disk, CD-ROM, DVD-ROM, or the like.

Video capture system 202 includes video capture device 208, video decoder 210, video compressor 212, codec RAM 214, and data processor 216. Video capture device 208 is coupled with video decoder 210 through link 222, video decoder 210 is coupled with video compressor 212 through link 224, and video compressor 212 is coupled with codec RAM 214 through link 228 and with data processor 216 through link 226. These links may be wireless or wired links. They may include other network devices such as gateways, routers, networks, and the like. They also may use any of a wide variety of communication protocols. In an example, links 222, 224, 226, and 228 are high speed local buses all contained within video capture system 202 to allow for high speed data transfers between the individual devices making up video capture system 202.

In an example, video capture device 208 captures video data of a scene and transfers the analog video data to video decoder 210 through link 222. Video decoder 210 decodes the analog video data into digital video data, and transfers the digital video data to video compressor 212 over link 224. Video compressor 212 along with codec RAM 214 compresses the digital video data into any of a wide variety of formats such as AVI, MPEG, or the like. Video compressor 212 transfers the compressed video data to data processor 216 over link 226.

In an example, link 218 is a PCI data bus. In other examples, link 218 may be a PCI Express (PCI-E) data bus. In this example, data processor 216 is configured to act as a PCI master device, enabling it to write the compressed digital video data to video processing system 204 over the PCI (or PCI-E) data bus. Since PCI writes are quicker than PCI reads, data processor 216 allows for increased data performance between video capture system 202 and video processing system 204.

Video processing system 204 receives the compressed digital video data from data processor 216 over link 218. In an example, link 218 may be a PCI data bus, in which case video processing system 204 acts as a PCI slave to receive the compressed digital video data as written by data processor 216, acting as a PCI master, through the PCI data bus. Video processing system 204 then writes the compressed digital video data onto memory device 206 through link 220. In an example, link 220 may also be a PCI data bus, and video processing system 204 acts as a PCI master in writing the video data to memory device 206. Since both data transfers over PCI data buses 218 and 220 are PCI writes, data transfer rates between video capture system 202, video processing system 204, and memory device 206 are maximized.

Figure 3:
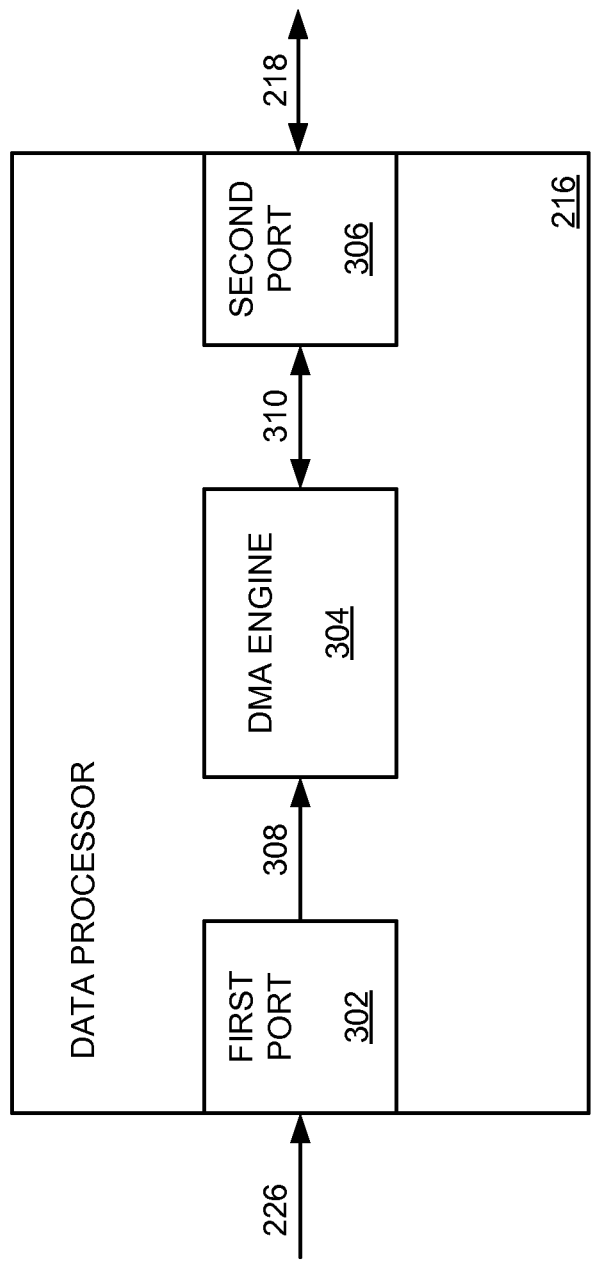
FIG. 3 illustrates a data processing device.

FIG. 3 illustrates data processor 216. Data processor 216 includes first port 302, direct memory access (DMA) engine 304, and second port 306. First port 302 is coupled with DMA engine 304 through link 308, while DMA engine 304 is coupled with second port 306 through link 310. Links 308 and 310 may be constructed of any of a wide variety of materials including metals, optical fibers, and air, and may use any of a wide variety of protocols for communication. In an example, links 308 and 310 are high speed local buses.

First port 302 is configured to receive compressed digital video data from video compressor 212 over link 226. Second port 306 is configured to write compressed video data to video processing system 204 over link 226. In an example, DMA engine 304 is configured to act as a PCI master and to write compressed digital video data to video processing system 204 over PCI bus 218 through second port 306. DMA engine 304 is also configured to receive a contiguous scatter-gather list from video processing system 204 over PCI bus 218 through second port 306 in a contiguous DMA write.

In this example, DMA engine 304 is further configured to use the contiguous scatter-gather list to configure the compressed digital video data into a format corresponding to the actual memory locations in memory device 206 where the data will reside according to the contiguous scatter-gather list. These operations are discussed in detail below with respect to FIGS. 5 and 6.

In an example, first port 302, DMA engine 304, and second port 306 may be constructed in a single device and links 308 and 310 may be local data buses within the device. The data processing device 215 may be an application specific integrated circuit (ASIC) such as a gate array, a programmable gate array (PGA), a field programmable gate array (FPGA), or the like.

Figure 4:
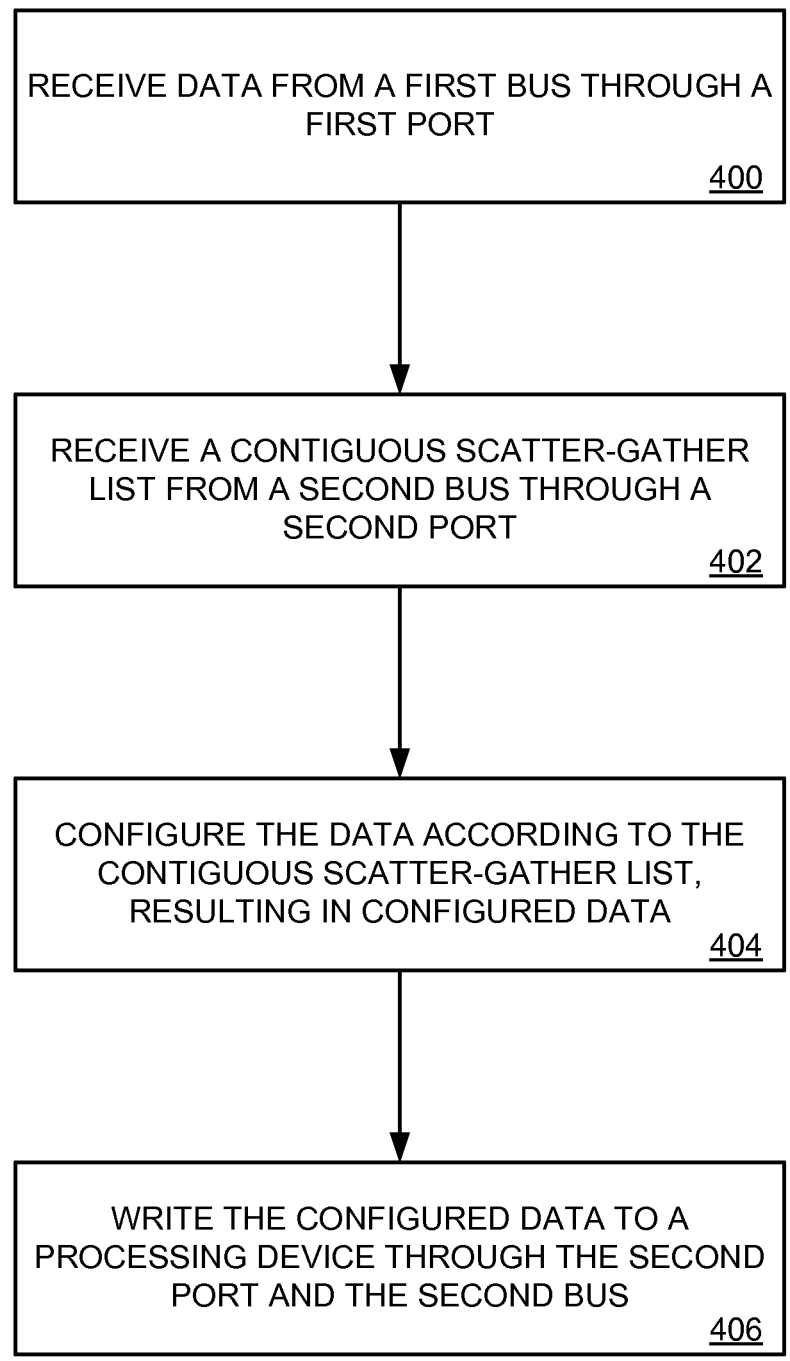
FIG. 4 illustrates a method of operating a data processing device.

FIG. 4 illustrates a method of operating data processing device 216. In this example, data processor 216 receives data from first bus 226 through first port 302 (operation 400). DMA engine 304 receives a contiguous scatter-gather list from second bus 218 through second port 306 (operation 402).

DMA engine 304 configures the data according to the contiguous scatter-gather list, resulting in configured data (operation 404). This data configuration operation is discussed in more detail below with respect to FIGS. 5 and 6. Data processor 216 writes the configured data to video processing device 204 through second port 306 and second bus 218 (operation 406). In an example, second bus 218 is a PCI data bus, and DMA engine 304 acts as a PCI master in writing data to video processing device 204 through second port 306.

FIG. 5 illustrates register map 500 of a contiguous scatter-gather list. In an example, the contiguous scatter-gather list is configured to be stored in a plurality of memory locations or registers as illustrated in register map 500. The contiguous scatter-gather list is constructed such that it can be written to data processor 216 in a single DMA operation. In this example, register map 500 includes four columns of data. The first column of data 502 contains the offset of the memory location of each register in the list. Note that the offsets of the memory locations are contiguous such that the contiguous scatter-gather list exists in a single, contiguous chunk of memory. This continuity allows for faster traversals of the contiguous scatter-gather list. The second column of data 504 contains the names of each register containing the contiguous scatter-gather list. The third column of data 506 contains the access type of each register in the contiguous scatter-gather list. RW indicates a register available for both reads and writes, while W indicates a register available for writes. The fourth column of data 508 contains a description of the contents or purpose of each register in the contiguous scatter-gather list.

In this example, register DMA_SG_PCI_SIZE_0 at offset 0x07FC contains the size of the first chunk of data, while register DMA_SG_PCI_ADDRESS_0 at offset 0x7F8 contains the memory address of the first entry of the first chunk of data. Register DMA_SG_PCI_SIZE_1 at offset 0x07F4 contains the size of the second chunk of data, while register DMA_SG_PCI_ADDRESS_1 at offset 0x7F0 contains the memory address of the first entry of the second chunk of data. This register configuration is repeated up through register DMA_SG_PCI_SIZE_255 at offset 0x0004 contains the size of the 256th chunk of data, while register DMA_SG_PCI_ADDRESS_255 at offset 0x000 contains the memory address of the first entry of the 256th chunk of data.

Register DMA_SIZE at offset 0x0800 contains the total transfer size, measured in bytes, while register DMA_CONTROL at offset 0x0804 is used to kick start the DMA engine on a write operation. Once again, notice that all of the memory locations used for the scatter-gather list are contiguous from offsets 0x0000 through 0x0804. In some examples, the contiguous scatter-gather list may be written to the DMA engine in more than one DMA operation. However, the benefit of the continuity of the scatter-gather list remains. There are a wide variety of possible structures and formats of contiguous scatter-gather lists available for use, and any of them may be used to instruct DMA engine 304 how to configure the data for storage in memory device 206. These example data chunks within memory device 206 are illustrated in detail in FIG. 6 and described below.

Figure 6:
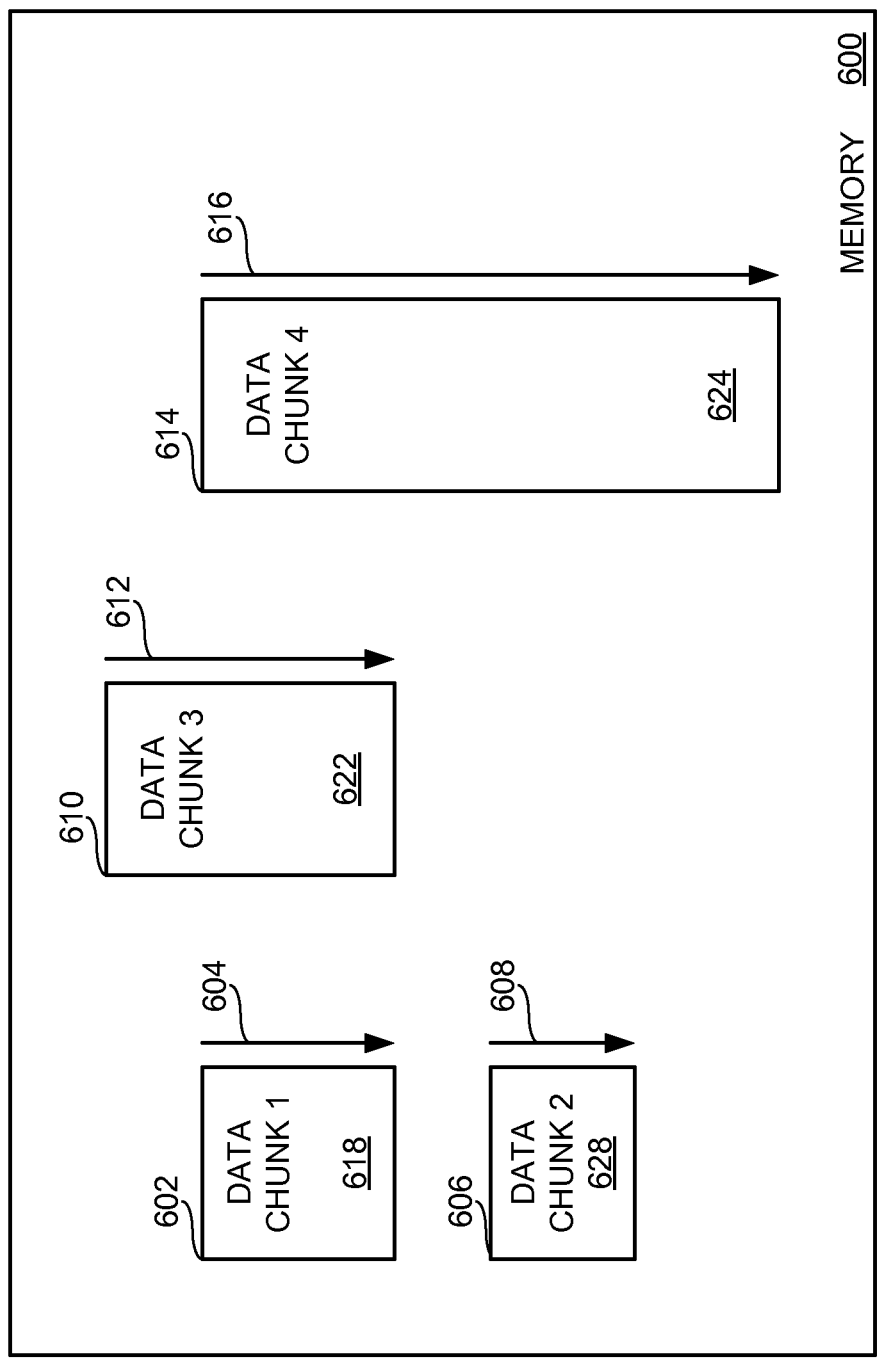
FIG. 6 illustrates a memory device.

FIG. 6 illustrates the contents of a memory 600. In this example, memory 600 contains four chunks of data: data chunk 1 618, data chunk 2 620, data chunk 3 622, and data chunk 4 624. Data chunk 1 618 starts at memory location 602 and has a size represented by 604. Data chunk 2 620 starts at memory location 606 and has a size represented by 608. Data chunk 3 622 starts at memory location 610 and has a size represented by 612. Data chunk 4 624 starts at memory location 614 and has a size represented by 616.

In this example, memory location 602 is stored in register DMA_SG_PCI_ADDRESS_0 at offset 0x07F8 from FIG. 5, while size 604 is stored in register DMA_SG_SIZE_0 at offset 0x07FC. Memory location 606 is stored in register DMA_SG_PCI_ADDRESS_1 at offset 0x07F0 from FIG. 5, while size 608 is stored in register DMA_SG_SIZE_1 at offset 0x07F4. Memory location 610 is stored in register DMA_SG_PCI_ADDRESS_2 at offset 0x07E8 from FIG. 5, while size 612 is stored in register DMA_SG_SIZE_2 at offset 0x07EC. Memory location 614 is stored in register DMA_SG_PCI_ADDRESS_3 at offset 0x07E0 from FIG. 5, while size 616 is stored in register DMA_SG_SIZE_3 at offset 0x07E4. The sum of sizes 604, 608, 612, and 616, in bytes, is stored in register DMA_SIZE at offset 0x0800.

While this example illustrates four data chunks of various sizes at various locations in memory 600, other examples may include any number of data chunks of any size within memory 600. In the example illustrated in FIG. 5, the user is limited to 256 chunks of data, however, other examples may use longer contiguous scatter-gather lists capable of referencing any number of data chunks.

Figure 7:
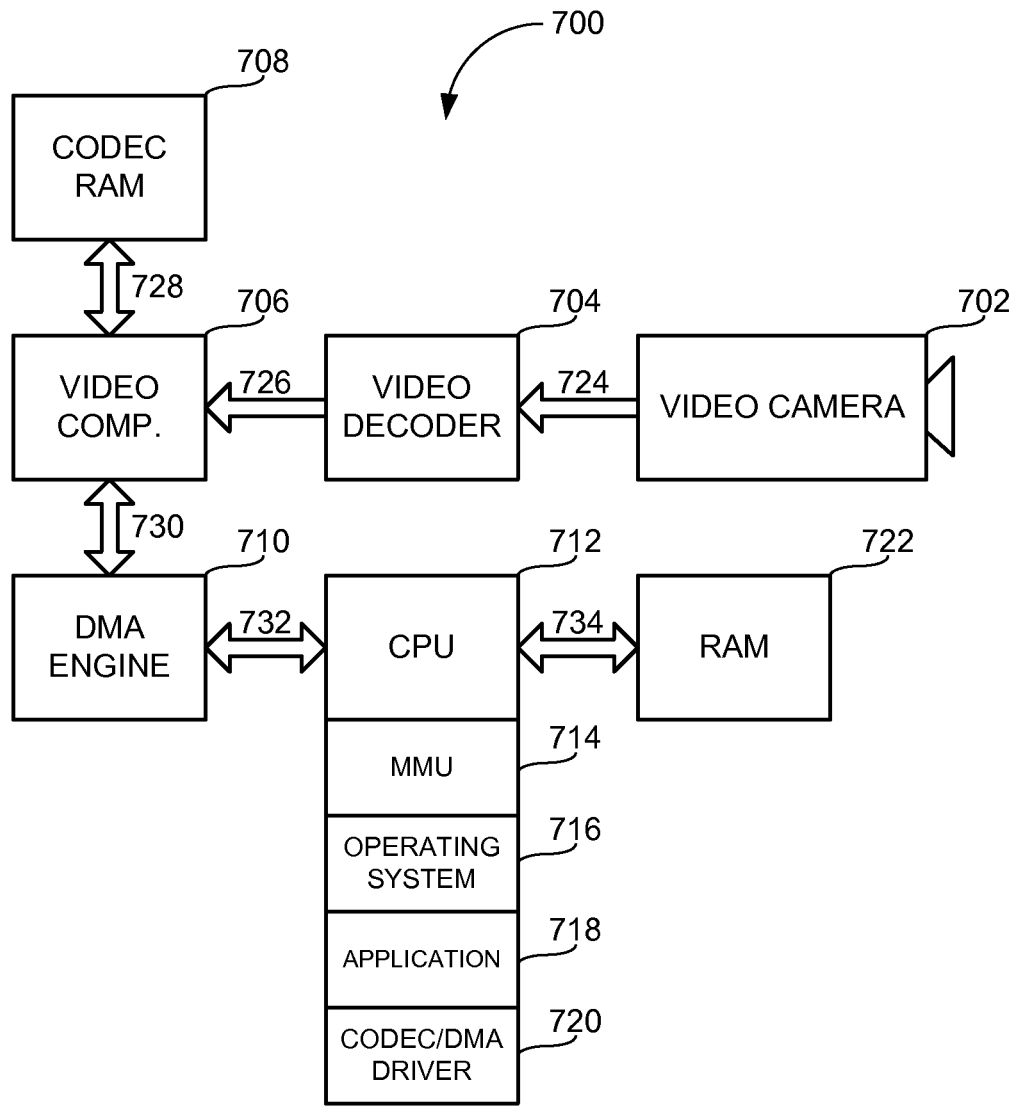
FIG. 7 illustrates a video system.

FIG. 7 illustrates video system 700. This example video system 700 includes video camera 702, video decoder 704, video compressor 706, coded RAM 708, DMA engine 710, CPU 712, and RAM 714. Video camera 702 is configured to capture video data of a scene and transfer the video data to video decoder 704 over link 724. Video decoder 704 is configured to decode the analog video data into digital video data and transfer the digital video data to video compressor 706 over link 726. Video compressor 706 communicates with codec RAM over link 728, and is configured to compress the digital video data. Video compressor 706 is also configured to transfer the compressed digital video data to DMA engine 710 over link 730.

DMA engine 710 is configured to receive a contiguous scatter-gather list from CPU 712 over PCI bus 732. The contiguous scatter-gather list is written to DMA engine 710 in a contiguous DMA operation. DMA engine 710 is also configured to configure the compressed digital video data into configured data according to the contiguous scatter-gather list. DMA engine then writes the configured data to CPU 712 over PCI bus 732. Since DMA engine 710 is configured as a PCI master, it is able to write the configured data directly to CPU 712 instead of requiring CPU 712 to read the configured data from DMA engine 710. This speeds up the transfer of configured data from DMA engine 710 to CPU 712.

CPU 712 is also configured to communicate with RAM 722 over link 734. This RAM is configured to store the configured data according to the contiguous scatter-gather list in a plurality of data chunks. CPU 712 includes a plurality of software or firmware programs including, but not limited to, memory management unit (MMU) 714, operating system 716, application 718, and coded/DMA driver 720. These programs operate as described above to receive signals from DMA engine 710 when configured data is ready to be written to RAM 722 through CPU 712, generate a contiguous scatter-gather list according to the configuration of RAM 722, transmit the contiguous scatter-gather list to DMA engine 710, and to receive configured data written by DMA engine 710 into RAM 722 through CPU 712.

Since DMA engine 710 is configured to operate as a PCI master, it is able to write data directly to CPU 712 instead of requiring CPU 712 to read data from video compressor 706. Since PCI writes are faster than PCI reads, this enhances the data transfer rate between video compressor 706 and CPU 712.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A data processing device comprising:
    a first port configured to receive compressed digital video data from a first bus;
    a direct memory access (DMA) engine coupled to the first port configured as a peripheral component interconnect (PCI) master, and further configured to:
        receive the compressed digital video data from the first bus;
        receive a contiguous scatter-gather list from a processing device via a second port;
        configure the compressed digital video data according to the contiguous scatter-gather list; and
        provide the configured data to the processing device through the second port using a PCI write and acting as a PCI master; and
    the second port configured to write the configured data to the processing device over a second bus configured as a PCI bus.

2. The data processing device of claim 1, wherein the first bus is a local bus.

3. The data processing device of claim 1, wherein the second bus is a PCI Express (PCI-E) bus.

4. The data processing device of claim 1, wherein the data is video data from a video capture device.

5. The data processing device of claim 1, wherein the data is compressed digital video data from a video capture device.

6. The data processing device of claim 1, wherein the contiguous scatter-gather list is received from the processing device in a single DMA operation.

7. The data processing device of claim 1, wherein the DMA engine is an application specific integrated circuit (ASIC).

8. The data processing device of claim 7, wherein the DMA engine is a field programmable gate array (FPGA).

9. A method for the operation of a data processing device configured as a peripheral component interconnect (PCI) master, the method comprising:
    receiving compressed digital video data through a first port from a first bus;
    receiving a contiguous scatter-gather list through a second port from a second bus configured as a PCI bus;
    configuring the compressed digital video data according to the contiguous scatter-gather list, resulting in configured data; and
    writing the configured data to a processing device through the second port and the second bus using a PCI write and acting as a PCI master.

10. The method of claim 9, wherein the first bus is a local bus.

11. The method of claim 9, wherein the second bus is a PCI Express (PCI-E) bus.

12. The method of claim 9, wherein the data is video data from a video capture device.

13. The method of claim 9, wherein the data is compressed digital video data from a video capture device.

14. The method of claim 9, wherein the contiguous scatter-gather list is received from the processing device in a single DMA operation.

15. The method of claim 9, wherein the data processing device is an application specific integrated circuit (ASIC).

16. The method of claim 15, wherein the data processing device is a field programmable gate array (FPGA).

17. A video system comprising:
    a video capture device configured to capture video data of a scene;
    a video decoder coupled to the video capture device, configured to translate captured video data to digital video data;
    a video compressor coupled to the video decoder, configured to compress the digital video data resulting in compressed digital video data;
    a data processor coupled to the video compressor, comprising:
        a first port configured to receive compressed digital video data from the video compressor;
        a direct memory access (DMA) engine coupled to the first port, configured to receive compressed digital video data from the first port; and
        a second port configured to write configured video data to a peripheral component interconnect (PCI) bus;
    a video processor coupled to the data processor, configured to receive configured video data from the data processor through the PCI bus; and
    a memory device coupled to the video processor, configured to store configured video data;
    wherein the DMA engine is configured to:
        receive a contiguous scatter-gather list at the second port from the video processor through the PCI bus;
        configure the compressed video data according to the contiguous scatter-gather list resulting in configured video data; and
        write the configured video data to the video processor through the second port and the PCI bus using a PCI write and acting as a PCI master;
    wherein the video processor is configured to store the configured video data in the memory device.

18. The video system of claim 17, wherein the bus is a PCI Express (PCI-E) bus.

* * * * *